United States Patent
Cutsforth

(10) Patent No.: US 9,209,667 B2
(45) Date of Patent: *Dec. 8, 2015

(54) GROUNDING ROPE GUIDE FOR A DYNAMO-ELECTRIC MACHINE

(71) Applicant: Cutsforth, Inc., Cohasset, MN (US)

(72) Inventor: Robert S. Cutsforth, Bellingham, WA (US)

(73) Assignee: Cutsforth, Inc., Cohasset, MN (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/923,541

(22) Filed: Jun. 21, 2013

(65) Prior Publication Data

US 2013/0285514 A1    Oct. 31, 2013

Related U.S. Application Data

(63) Continuation of application No. 13/204,134, filed on Aug. 5, 2011, now Pat. No. 8,493,707.

(51) Int. Cl.
| | |
|---|---|
| *H02K 11/00* | (2006.01) |
| *H02G 3/04* | (2006.01) |
| *H01R 39/64* | (2006.01) |
| *H02G 11/00* | (2006.01) |

(52) U.S. Cl.
CPC ......... *H02K 11/0089* (2013.01); *H02G 3/0468* (2013.01); *H01R 39/64* (2013.01); *H02G 3/0475* (2013.01); *H02G 11/006* (2013.01); *Y10T 29/49117* (2015.01)

(58) Field of Classification Search
CPC . H02G 3/0468; H02G 3/0475; H02G 11/006; H02K 11/0089; Y10T 29/49117; H01R 36/64

USPC ........................................................ 361/220
See application file for complete search history.

(56) References Cited

U.S. PATENT DOCUMENTS

| | | | |
|---|---|---|---|
| 4,873,512 | A | 10/1989 | Miller |
| 5,227,950 | A | 7/1993 | Twerdochlib |
| 5,233,499 | A | 8/1993 | Twerdochlib |
| 7,339,777 | B2 | 3/2008 | Barnard et al. |
| 2004/0233592 | A1 | 11/2004 | Oh |
| 2007/0159763 | A1 | 7/2007 | Barnard et al. |

FOREIGN PATENT DOCUMENTS

| | | |
|---|---|---|
| DE | 102009004060 A1 | 7/2010 |
| EP | 2233782 A1 | 9/2010 |
| FR | 2691587 A1 | 11/1993 |

OTHER PUBLICATIONS

Authorized Officer Franco Zanichelli, International Search Report for PCT/US2012/049452 dated Jul. 8, 2014, 4 pages.

*Primary Examiner* — Thienvu Tran
*Assistant Examiner* — Kevin J Comber
(74) *Attorney, Agent, or Firm* — Seager, Tufte & Wickhem LLP

(57) ABSTRACT

A shaft grounding apparatus including a grounding rope in electrical contact with ground, and an adjustable rope guide configured to guide the grounding rope on an electrically conductive surface of a rotating shaft of an electric machine. The adjustable rope guide includes a plurality of articulating segments configured to provide the adjustable rope guide with a variable radius of curvature to closely follow a radius of curvature of the rotating shaft.

14 Claims, 15 Drawing Sheets

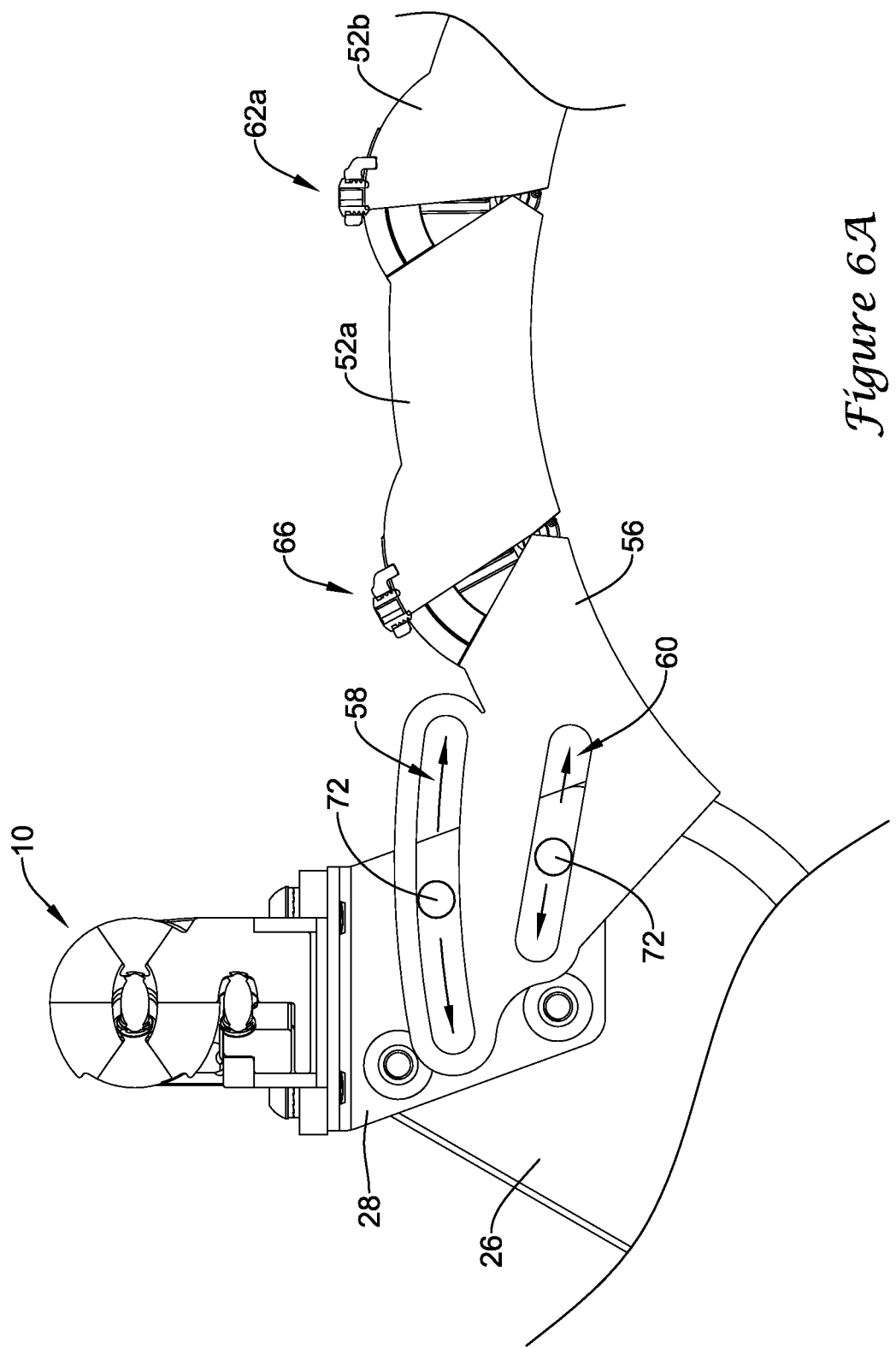

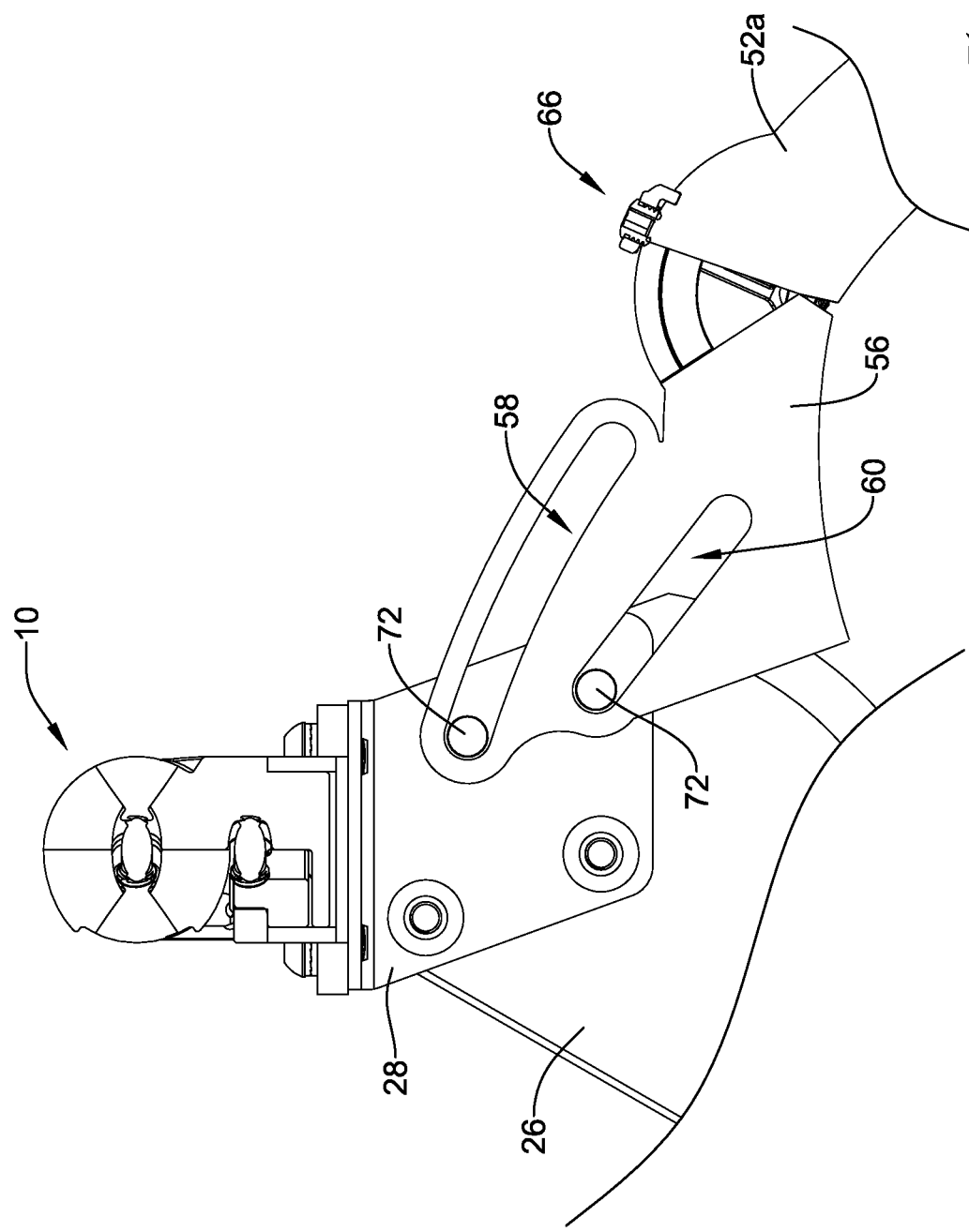

GROUNDING ROPE GUIDE FOR A DYNAMO-ELECTRIC MACHINE

CROSS-REFERENCE TO RELATED APPLICATION

The present application is a continuation application of U.S. patent application Ser. No. 13/204,134, filed Aug. 5, 2011, the complete disclosure of which is herein incorporated by reference.

TECHNICAL FIELD

The disclosure is directed to a guide for maintaining a grounding rope against a rotating mechanism of an electric machine. More particularly, the disclosure is directed to an adjustable rope guide configured to guide a grounding rope on an electrically conductive surface of a rotating shaft of an electric machine.

BACKGROUND

In many electric devices, such as electric generators and electric motors, stray voltage may build up on components of the electric device which may adversely affect components of the device, such as bearings within the electric device, and shorten the life of the electric device. In order to prevent current flow through these components, a grounding apparatus may be used to ground components of the electric device. Such grounding apparatus include grounding brushes, grounding straps, grounding ropes and other grounding devices configured to ground the rotating shaft of the electric device.

Accordingly, there is a need to provide alternative shaft grounding apparatus to ground components of an electric device, such as the rotating shaft of an electric device. It may be desirable to provide a shaft grounding apparatus including an adjustable grounding rope guide with a variable radius of curvature to accommodate a range of shaft sizes and/or configurations.

SUMMARY

The disclosure is directed to several alternative designs, materials and methods of manufacturing grounding rope guiding structures and assemblies, and uses thereof.

Accordingly, one illustrative embodiment is a shaft grounding apparatus including a grounding rope in electrical contact with ground, and an adjustable rope guide configured to guide the grounding rope on an electrically conductive surface of a rotating shaft. The adjustable rope guide is adjustable between a first position having a first radius of curvature and a second position having a second radius of curvature greater than the first radius of curvature to provide the adjustable rope guide with a variable radius of curvature to closely follow a radius of curvature of the rotating shaft. For instance, the adjustable rope guide may include a plurality of articulating segments configured to provide the adjustable rope guide with a variable radius of curvature to closely follow a radius of curvature of the rotating shaft.

Another illustrative embodiment is a rope guide for a shaft grounding apparatus. The rope guide includes a first guide segment pivotably coupled to a second guide segment. The first guide segment has a first end, a second end, and a channel extending from the first end to the second end for receiving a grounding rope therein. Similarly, the second guide segment has a first end, a second end, and a channel extending from the first end to the second end for receiving a grounding rope therein. The channel of the first guide segment is aligned with the channel of the second guide segment to permit the grounding rope to extend there along.

Yet another illustrative embodiment is a method of grounding a rotating shaft of a dynamo-electric machine. The method includes placing an electrically grounded rope in contact with a circumferential surface of the rotating shaft. An adjustable rope guide is positioned over the rope. The adjustable rope guide is configured to guide the rope on the circumferential surface of the rotating shaft. The adjustable rope guide includes a plurality of articulating segments configured to provide the adjustable rope guide with a variable radius of curvature to closely follow a radius of curvature of the rotating shaft. A first articulating segment of the adjustable rope guide is pivoted relative to a second articulating segment of the adjustable rope guide to adjust the radius of curvature of the adjustable rope guide to match the radius of curvature of the rotating shaft.

The above summary of some example embodiments is not intended to describe each disclosed embodiment or every implementation of the aspects of the disclosure.

BRIEF DESCRIPTION OF THE DRAWINGS

The aspects of the disclosure may be more completely understood in consideration of the following detailed description of various embodiments in connection with the accompanying drawings, in which:

FIGS. 6A-6C illustrate the adjustability of the connector segment shown in FIG. 5;

Figure 1:
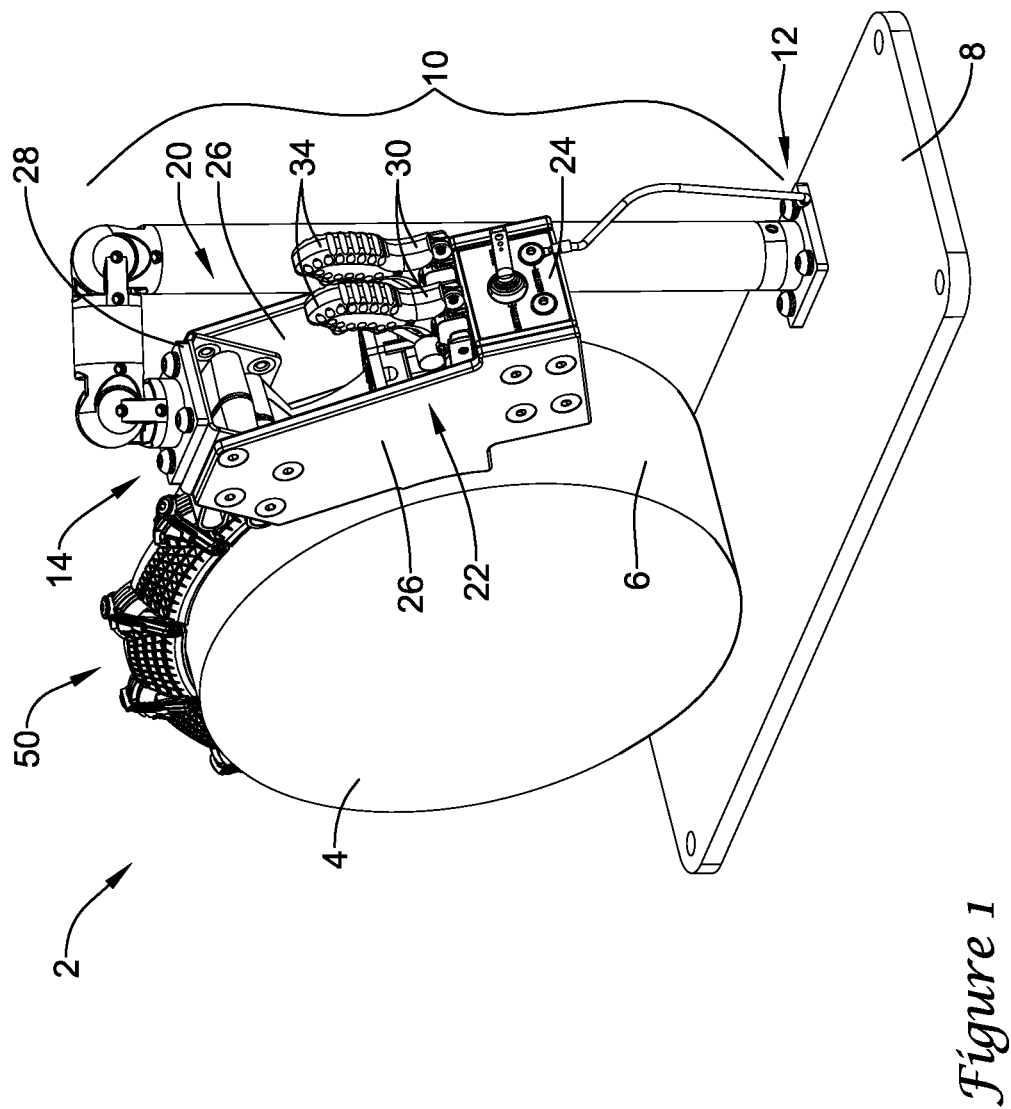
FIG. 1 is a perspective view of a portion of a rotating mechanism of an electric machine having a shaft grounding apparatus positioned on the shaft.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates a portion of an electric machine 2 having a rotating mechanism, such as a rotating shaft 4. The electric machine 2 may be a dynamo-electric machine, such as an electric generator which converts mechanical energy into electrical energy, or an electric motor which converts electrical energy into mechanical energy. Accordingly, the rotating shaft 4 may be a collector ring, or similar structure, of an electric generator or a commutator, or similar structure of an electric motor adapted and configured to interact with or be a part of a sliding connection to complete an electrical circuit between a fixed and a moving conductor to pass electrical current therebetween. For example, in at least some generators or motors, the collector rings or commutators are adapted and configured to complete a circuit with brush assemblies or riggings within the generator or motor. Those of skill in the art will recognize that the size and configuration of the rotating shaft 4 may vary, depending on the type and/or size of the generator or motor in which the rotating shaft 4 is used. For example, in some industrial applications, the rotating shaft 4 may have a diameter of 10 inches or more, 12 inches or more, 14 inches or more, 16 inches or more, 18 inches or more, 20 inches or more, 22 inches or more, or 24 inches or more. In other applications, the rotating shaft 4 may have a diameter of 10 inches or less, 8 inches or less, or 6 inches or less.

The rotating shaft 4, a portion of which is illustrated in FIG. 1, may be an elongate cylindrical shaft having an electrically conductive outer peripheral surface 6 configured to be in sliding electrical contact with one or more brushes of a brush holder assembly. An exemplary brush holder assembly is described in U.S. Pat. No. 7,034,430, herein expressly incorporated by reference in its entirety. In some instances, a shaft grounding apparatus 20 may be positioned proximate the rotating shaft 4 to ground the rotating shaft 4. For example, a mounting fixture 10 may be used to position the shaft grounding apparatus 20 in close proximity to the rotating shaft 4. In some instances, the mounting fixture 10 may include a first end 12 mounted to a base 8, or other stationary structure, and a second end 14 mounted to the shaft grounding apparatus 20. One such mounting fixture 10, is further described in and relates to the subject matter contained in the U.S. patent application entitled MOUNTING FIXTURE INCLUDING AN ARTICULATION JOINT filed on Aug. 5, 2011 by inventor Robert S. Cutsforth and having Ser. No. 13/204,176, which is expressly incorporated herein by reference in its entirety. However, it is understood that the mounting fixture 10 of any desired configuration to position the shaft grounding apparatus 20 in close proximity to the rotating shaft 4.

The shaft grounding apparatus 20 may include an electrical box 22 housing components of the shaft grounding apparatus 20. For example, the electrical box 22 may include one or more, or a plurality of brush holders 30 including brushes 32 in electrical contact with the electrically conductive peripheral surface 6 of the rotating shaft 4. The brush holders 30 may also include a handle 34 for removing the brush holder 30 from the electrical box 22. In some instances, the brush holders 30 may be similar to those described in U.S. Pat. No. 7,034,430. The electrical box 22 may also include a control box 24 for controlling the flow of electricity from the electrical box 22.

The shaft grounding apparatus 20 may also include a rope guide 50 extending from the electrical box 22. For example, the electrical box 22 may include first and second side panels 26 secured (e.g., bolted) to a mount 28 of the mounting fixture 10 and to the rope guide 50.

Figure 2:
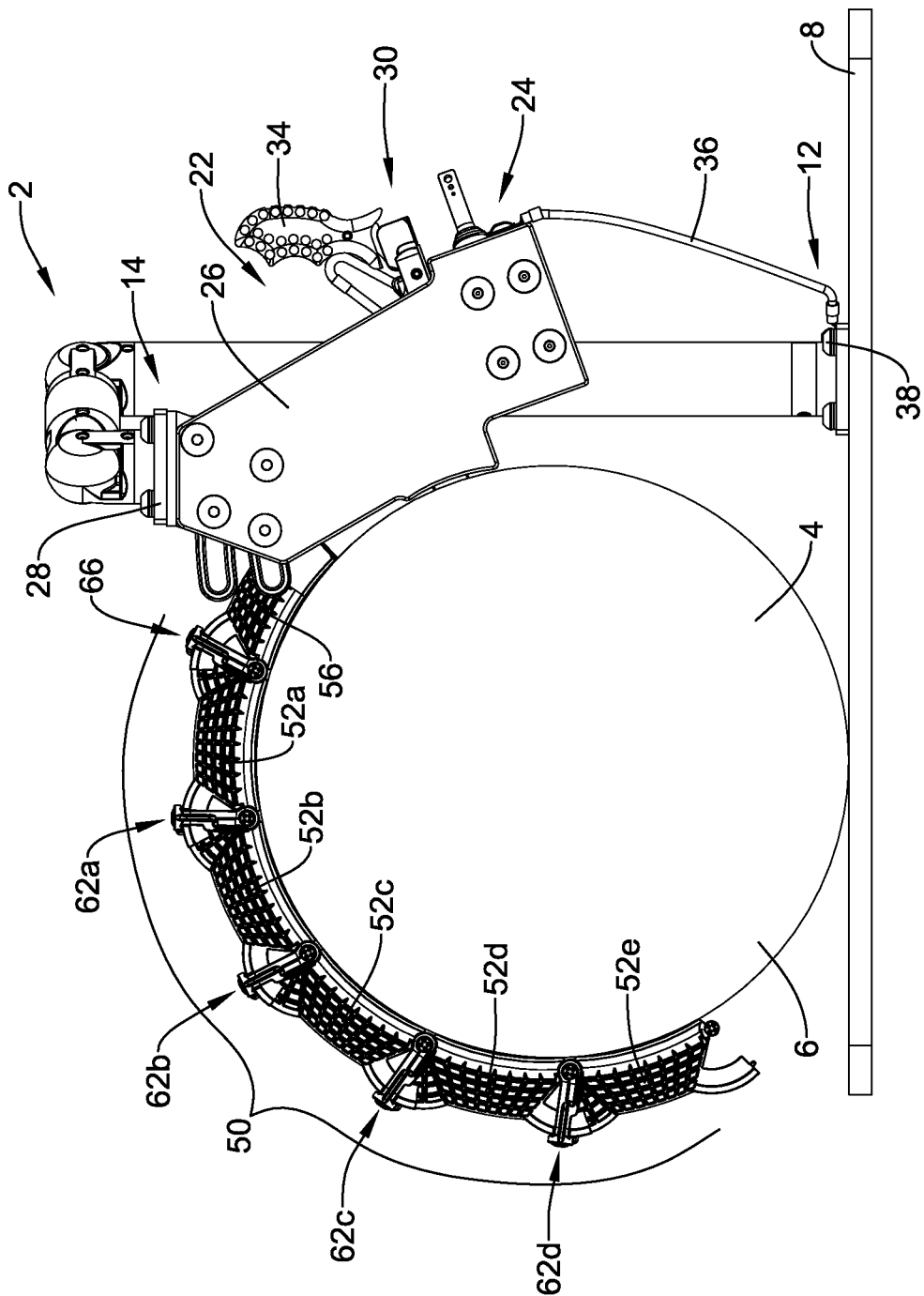
FIG. 2 is a side view of the shaft grounding apparatus of FIG. 1 positioned around the shaft of an electric machine.
Figure 3:
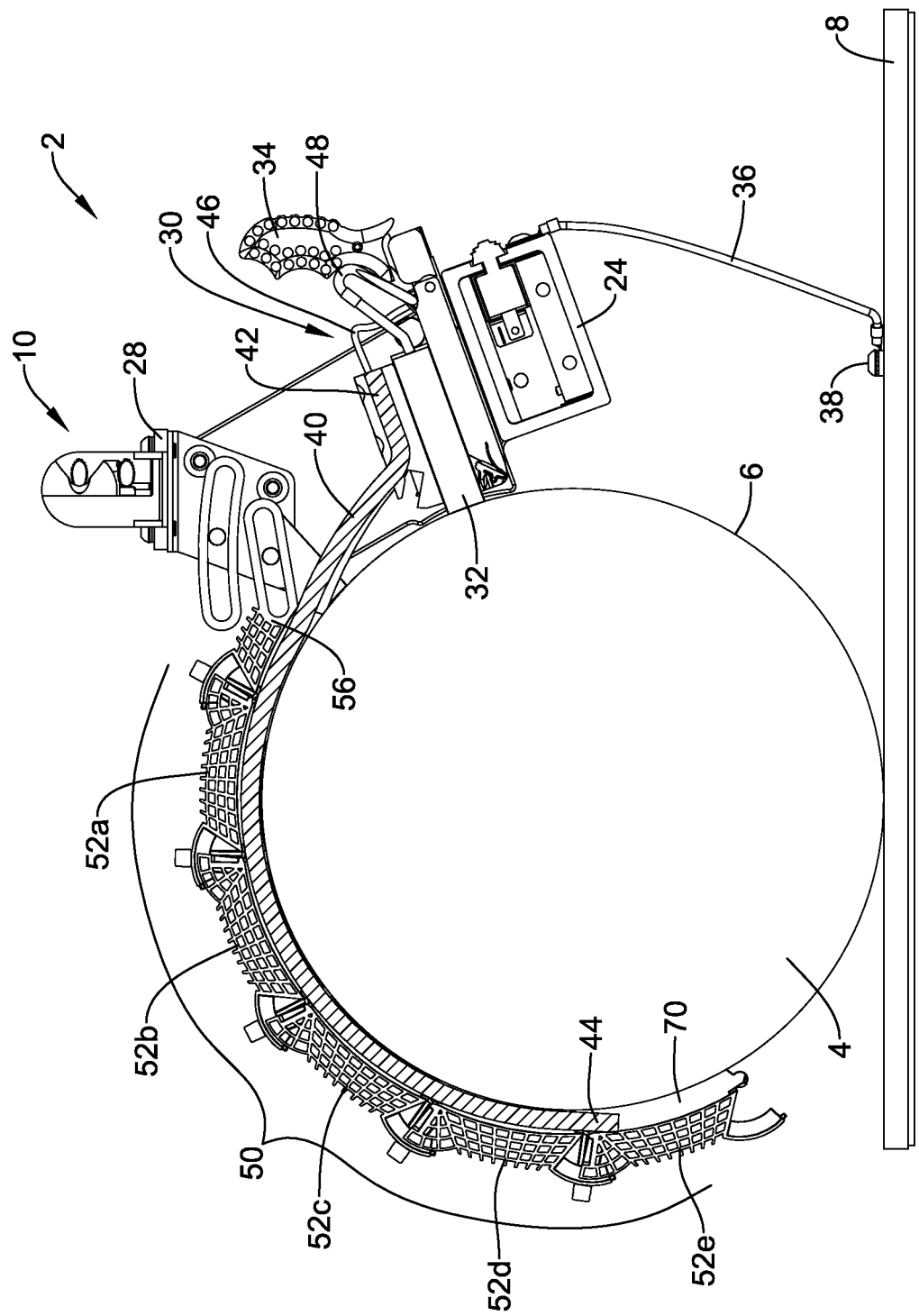
FIG. 3 is a cross-sectional view of the shaft grounding apparatus of FIG. 1 positioned around the shaft of an electric machine.

Turning to FIGS. 2 and 3, the rope guide 50 may be an adjustable rope guide configured to guide a grounding rope 40 on the electrically conductive surface 6 of the rotating shaft 4. For instance, the adjustable rope guide 50 may be adjustable between a first position having a first radius of curvature and a second position having a second radius of curvature greater than the first radius of curvature to provide the adjustable rope guide 50 with a variable radius of curvature to closely follow a radius of curvature of the rotating shaft 4. In some embodiments, the adjustable rope guide 50 may include a connector segment 56 and a plurality of articulating segments 52 configured to provide the adjustable rope guide 50 with a variable radius of curvature to closely follow a radius of curvature of the rotating shaft 4. In some embodiments, the connector segment 56 and/or the articulating segments 52 may be formed of a polymeric material, such as injection molded of a polymeric material, making the components of the rope guide 50 electrically insulated.

Depending on the diameter of the rotating shaft 4, and thus the length of the grounding rope 40, the rope guide 50 may include one, two, three, four, five, six or more articulating segments 52 pivotably coupled together at hinge points 62. For example, the illustrated rope guide 50 includes a first articulating segment 52a, a second articulating segment 52b, a third articulating segment 52c, a fourth articulating segment 52d, and a fifth articulating segment 52e, with a first hinge point 62a between the first and second articulating segments 52a, 52b, a second hinge point 62b between the second and third articulating segments 52b, 52c, a third hinge point 62c between the third and fourth articulating segments 52c, 52d, and a fourth hinge point 62d between the fourth and fifth articulating segments 52*d*, 52*e*. The first articulating segment 52*a* may also be pivotably coupled to the connector segment 56 at a hinge point 66.

The electrical pathway for grounding the rotating shaft 4 may be further understood with reference to FIG. 3. The electrical pathway may include a grounding rope 40 formed of a conductive material, such as copper or a copper alloy. The grounding rope 40, which extends through a channel 70 of the rope guide 50, may be positioned against the conductive surface 6 of the rotating shaft 4 such that the rotating shaft 4 slides against the grounding rope 40 as the rotating shaft 4 is rotating. The grounding rope 40 may be formed of a plurality of twisted multi-filar strands of conductive material, such as copper, or a copper alloy wires. In other instances, the grounding rope 40 may have a different configuration. As used herein, the term "grounding rope" includes alternative configurations such as a cable, wire, braid, band, strap or other elongate electrically conductive structure.

The grounding rope 40 may include a first end 42 coupled to a component in the electrical box 22 and a second end 44 hanging over the rotating shaft 4 in the direction of rotation of the rotating shaft 4. In some instances, the grounding rope 40 may have a length such that about 1 to 2 inches of the grounding rope 40 extends along the tangent line beyond the tangent between the conductive surface 6 and the grounding rope 40.

The first end 42 of the grounding rope 40 may be secured to a brush holder 30 in the electrical box 22. For example, the first end 42 of the grounding rope 40 may be clamped between two plates of the brush holder 30 in some instances. One of the strands 46 of the grounding rope 40 may extend further and be secured to a terminal of the brush holder 30 with a shunt 48 extending from the brush 32 of the brush holder 30, also in contact with the conductive surface 6 of the rotating shaft 4. From the terminal of the brush holder 30, the electrical pathway may pass through the control box 24 to a grounding wire 36 to ground 38. Thus, the grounding rope 40 may be connected to ground 38 through the electrical pathway passing through the electrical box 22, and thus grounded.

Figure 4:
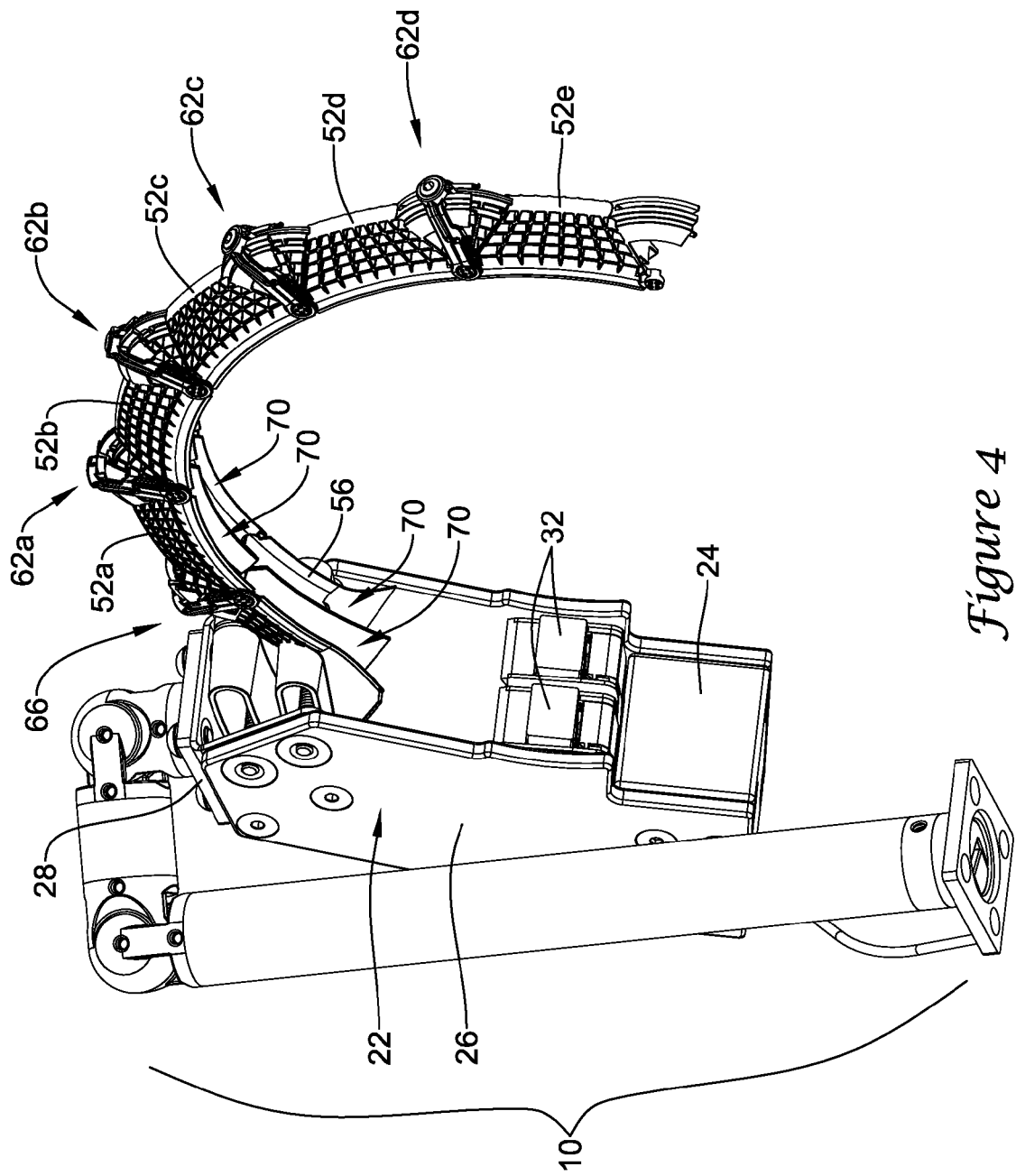
FIG. 4 is a perspective view of the shaft grounding apparatus of FIG. 1.

FIG. 4 illustrates the rope guide 50 extending from the electrical box 22 with the rotating shaft 4 removed to further illustrate features of the assembly. For example, the rope guide 50 is illustrated as including two parallel channels 70 separated by a dividing wall 74 configured for positioning a pair of grounding ropes 40 around the rotating shaft 4 in parallel with each other. It is understood, however, that in other embodiments the rope guide 50 may include one channel 70, or may include three, four, or more parallel channels 70 for guiding grounding ropes 40 against the conductive surface 6 of the rotating shaft 4.

Figure 5:
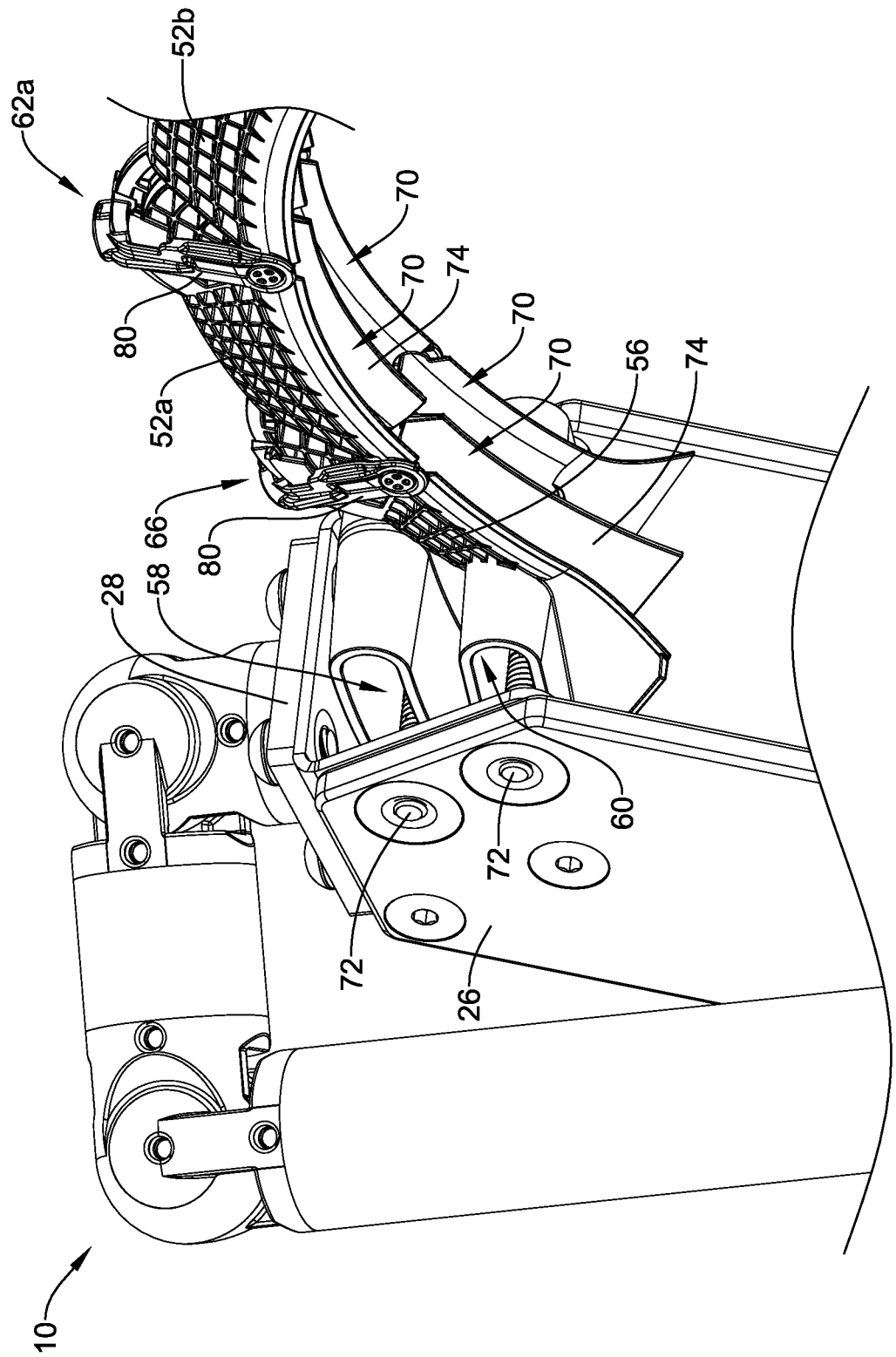
FIG. 5 is an enlarged perspective view of a connector segment of an exemplary rope guide of the shaft grounding apparatus of FIG. 1.

FIG. 5 is an enlarged view illustrating the connection between the connector segment 56 of the rope guide 50 and the side panels 26 of the electrical box 22. As shown in FIG. 5, the connector segment 56 may include a first slot 58 and a second slot 60, each configured to receive a fastener, such as a threaded bolt 72, therein. The first slot 58 may be located above the second slot 60. Each slot 58, 60 may be defined by a rim of material of the connector segment 56. It is understood that although only one side of the connector segment 56 is shown in FIG. 5, the opposite side of the connector segment 56 may be similarly configured with a first slot and a second slot to permit adjustment of the connector segment 56 relative to the electrical box 22. The threaded bolts 72 may extend through holes in the side panels 26 into the slots 58, 60 of the connector segment 56, and may be slidable along the extents of the slots 58, 60. For example, FIG. 6A illustrates the threaded bolts 72 positioned in the slots 58, 60 with the connector segment 56 at an intermediate position. Arrows shown in FIG. 6A illustrate the threaded bolts 72 may travel back and forth along the slots 58, 60 to adjust the angle of the connector segment 56 relative to the electrical box 22. In some embodiments the first slot 58 may be an arcuate slot, while the second slot 60 may be an arcuate slot or a straight slot. In other embodiments the first slot 58 may be a straight slot, while the second slot 60 may be an arcuate slot or a straight slot.

Figure 6C:
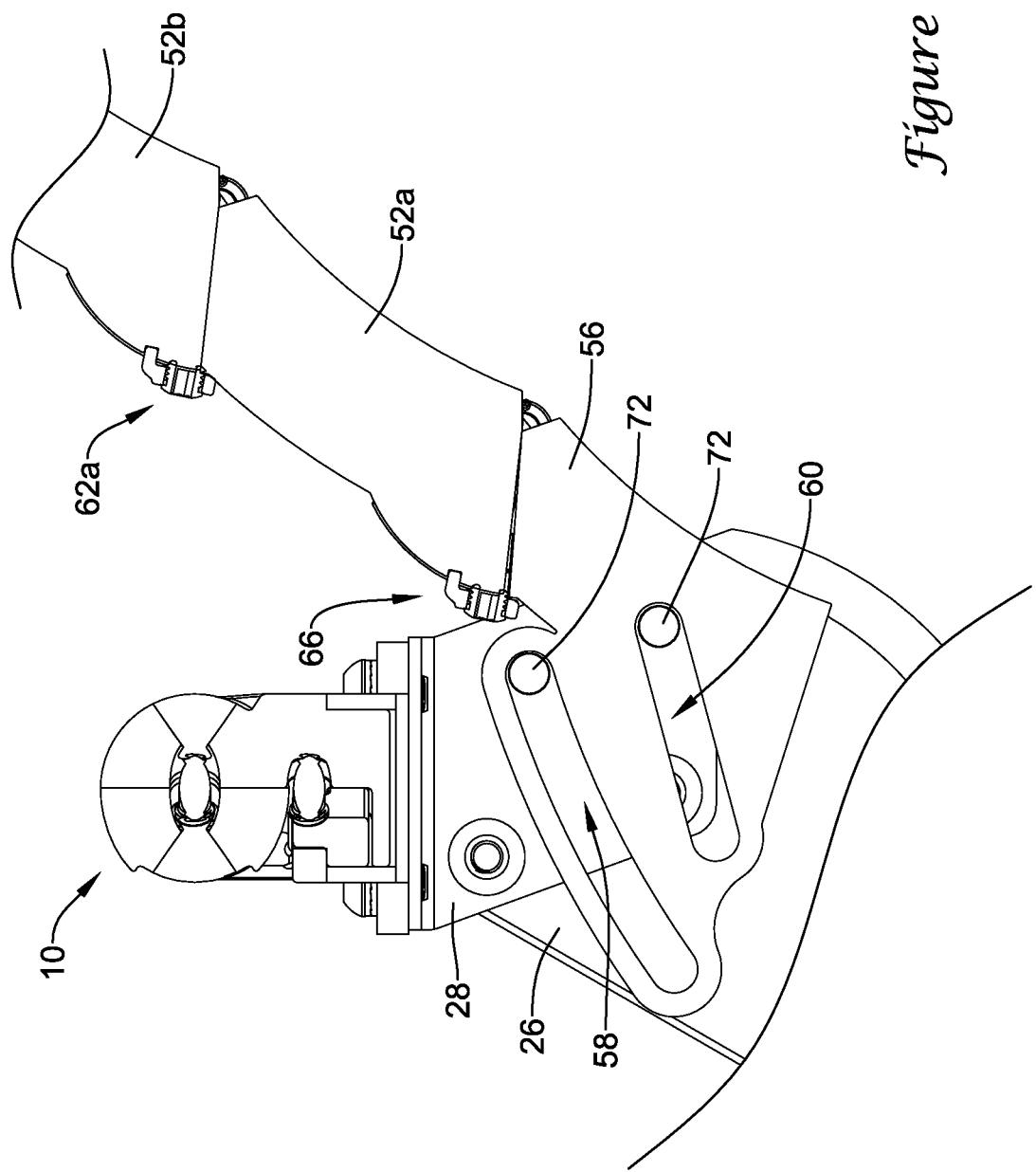
Figure 7:
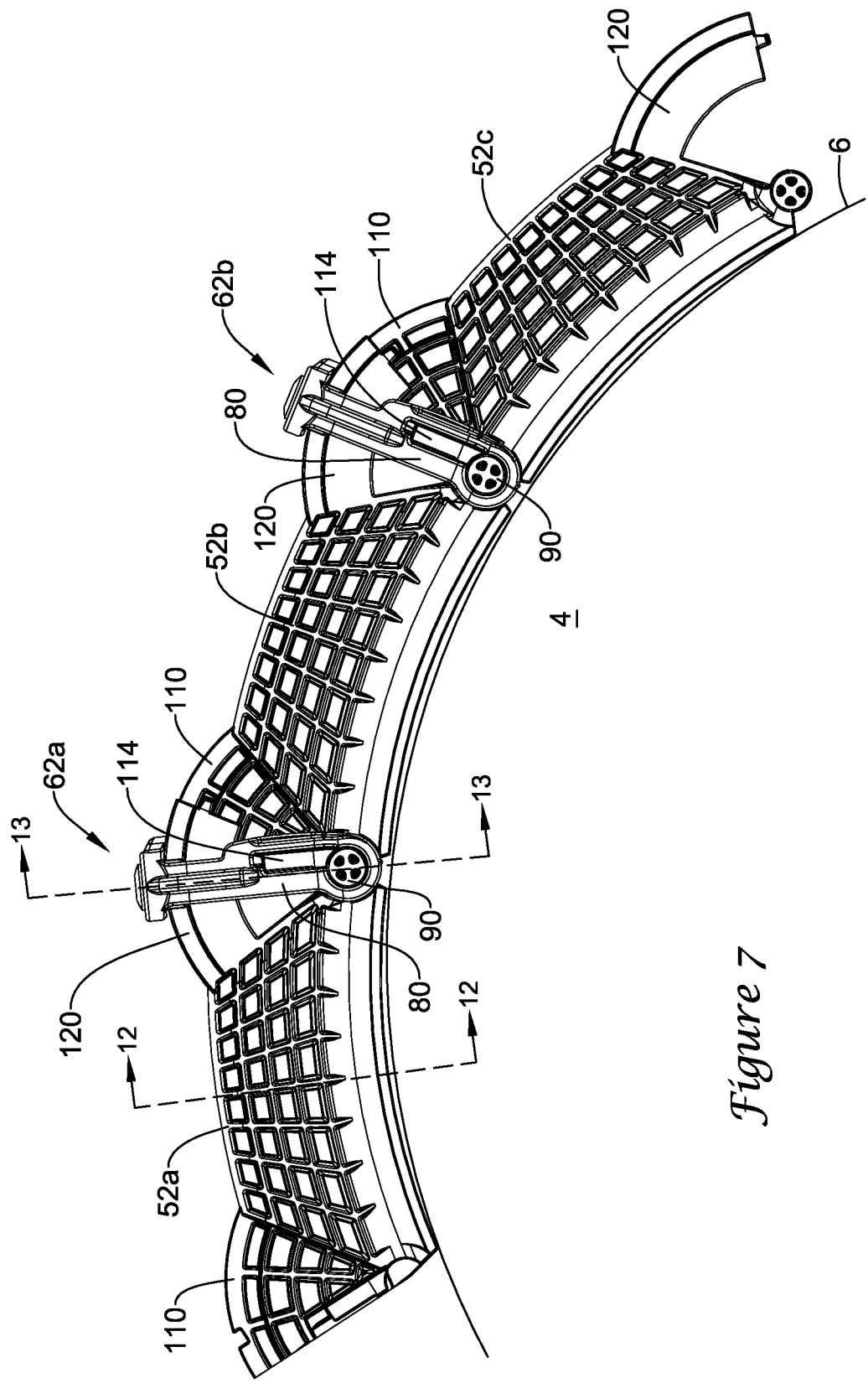
FIG. 7 is a side view of articulating segments of an exemplary adjustable rope guide.
Figure 8:
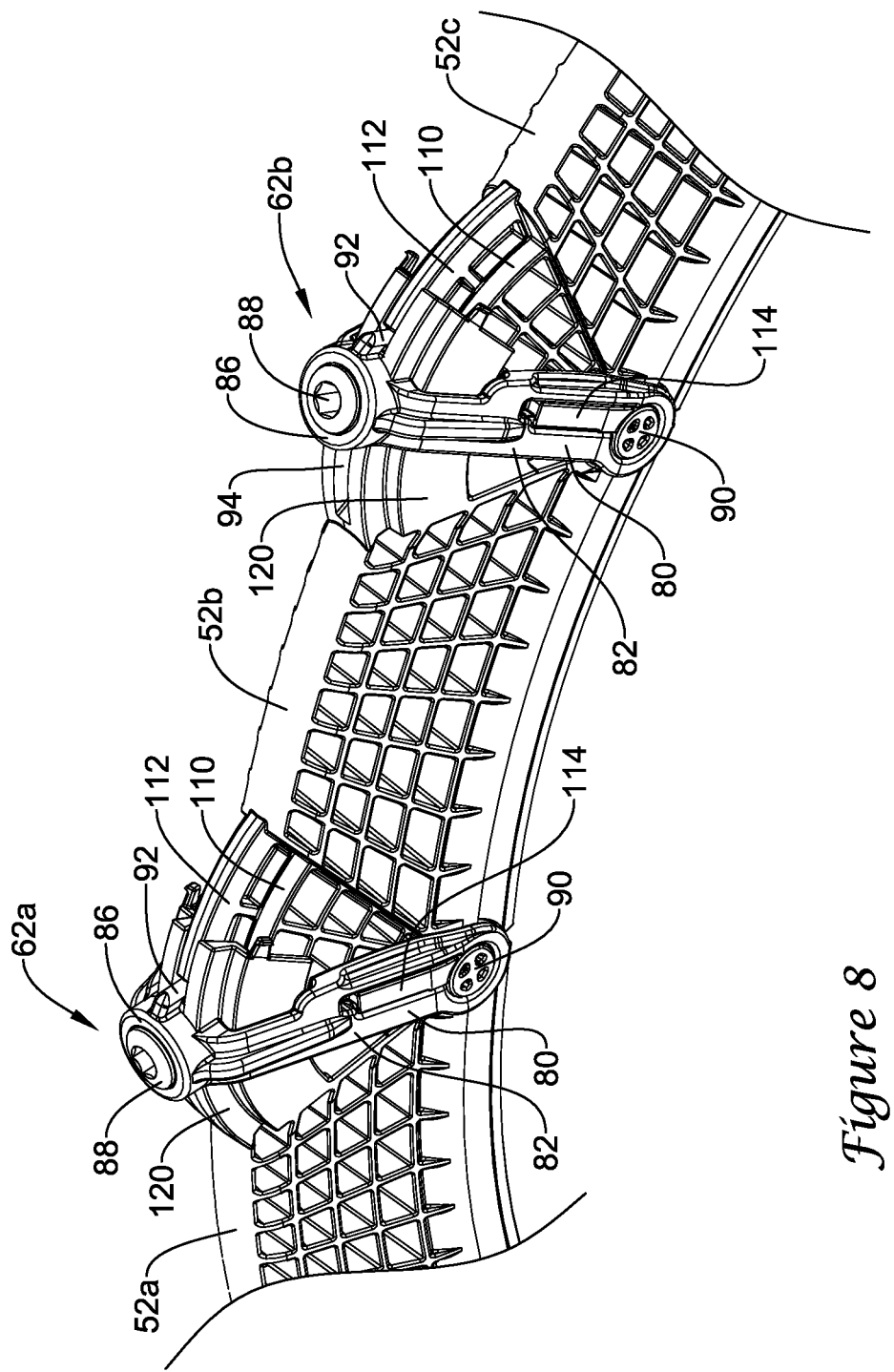
FIG. 8 is a perspective view of articulating segments of an exemplary adjustable rope guide.
Figure 9:
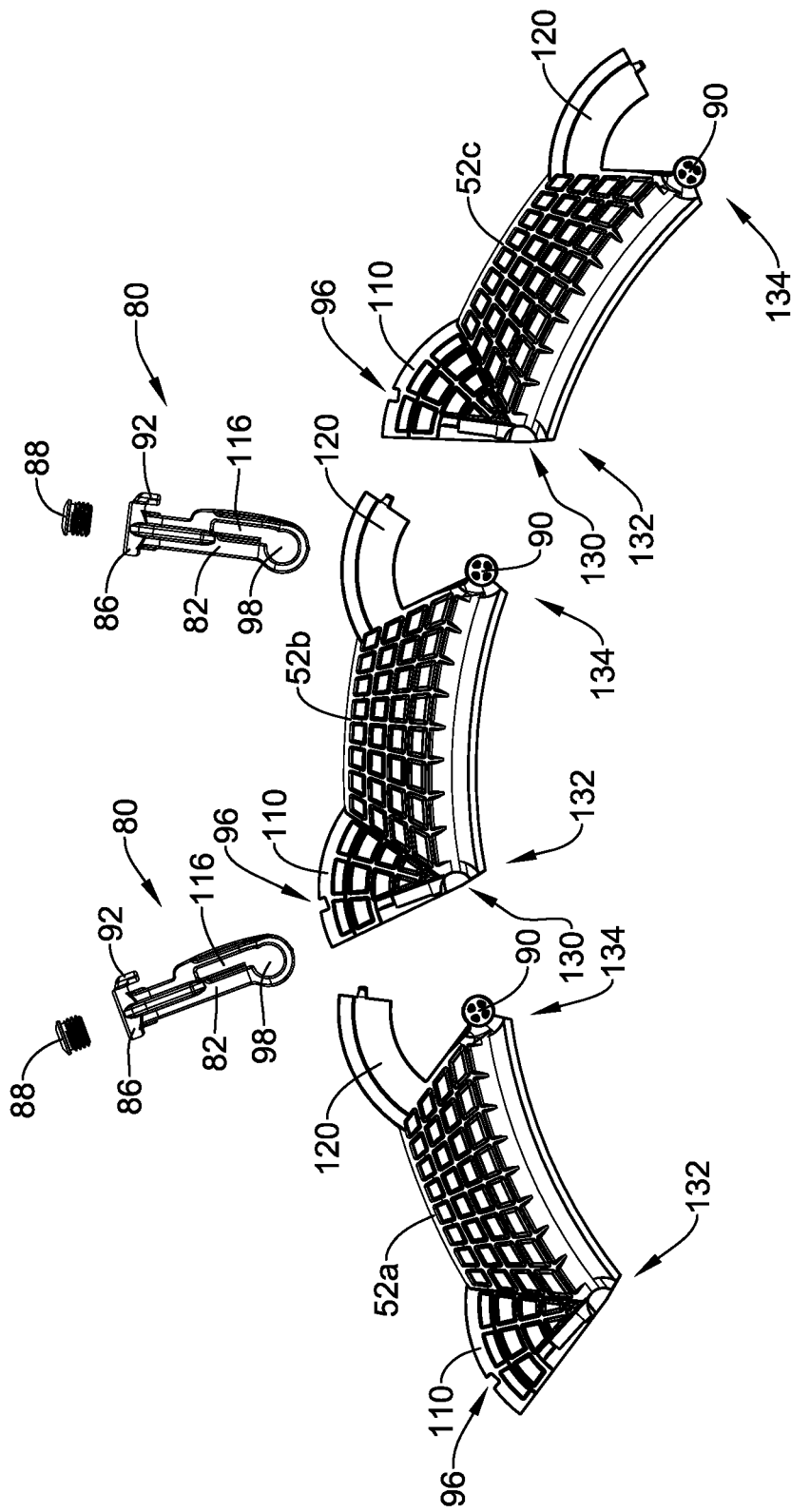
FIG. 9 is an exploded side view of components of an exemplary adjustable rope guide.
Figure 10:
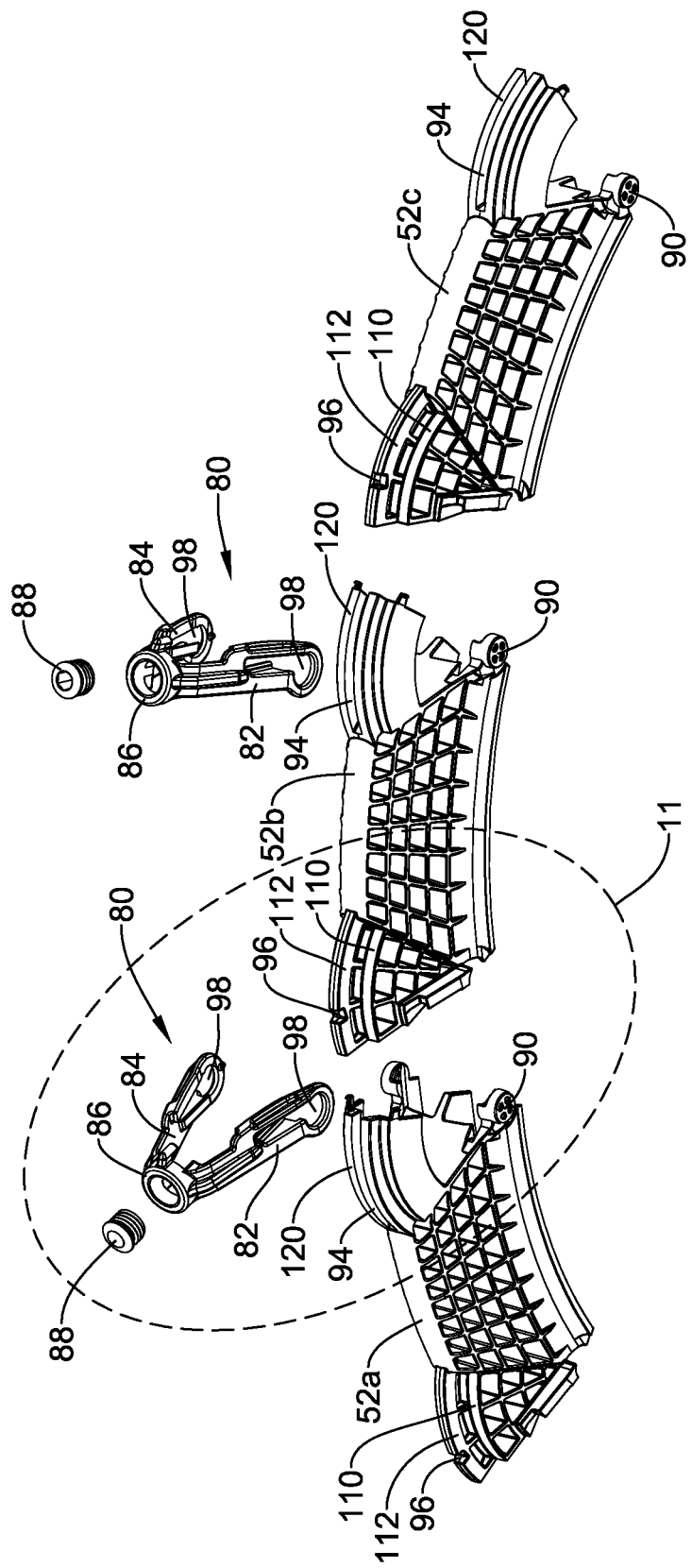
FIG. 10 is an exploded perspective view of components of an exemplary adjustable rope guide.
Figure 11:
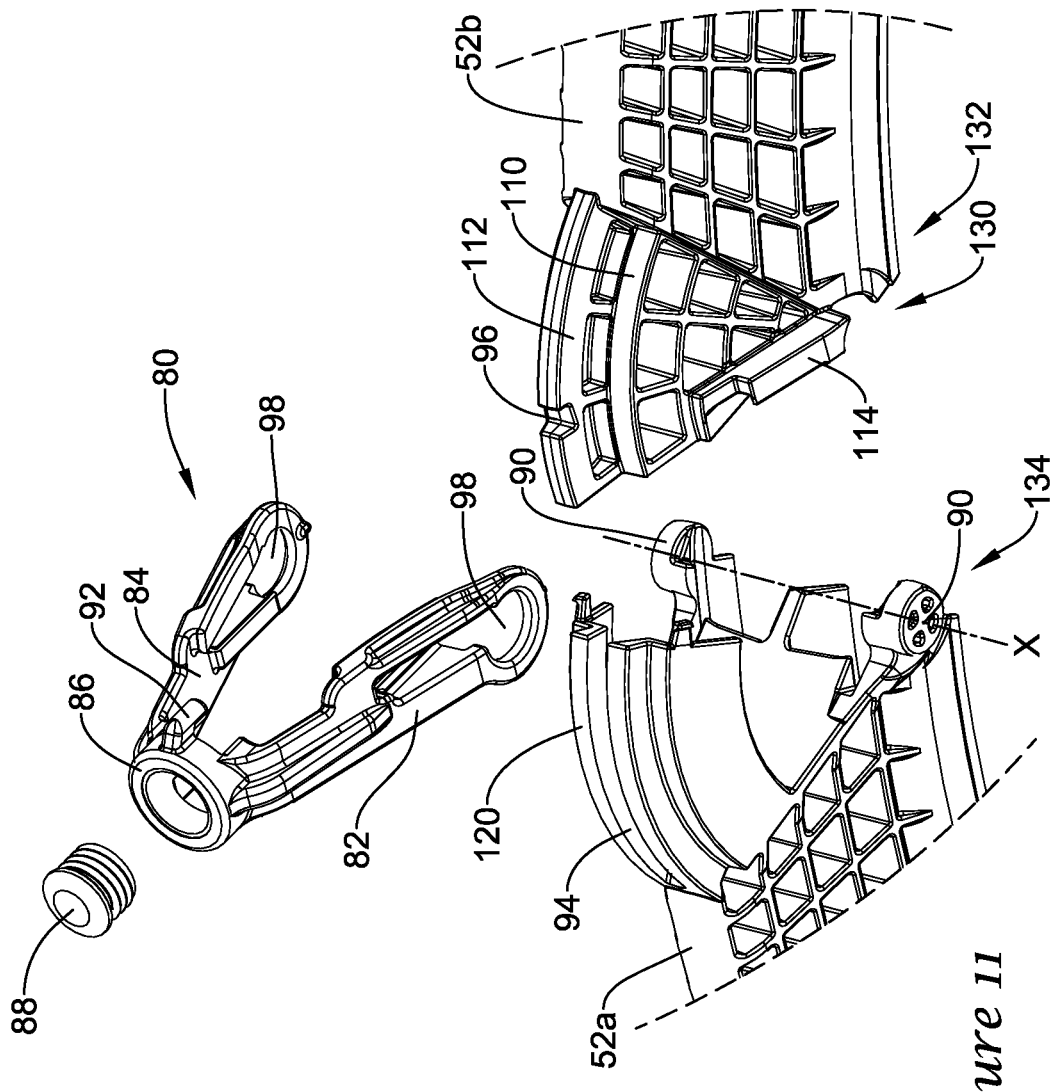
FIG. 11 is an enlarged perspective view of components illustrated in FIG. 10.

FIG. 6B illustrates the connector segment 56 in a first position in which the connector segment 56 has been adjusted to a first fullest extent permitting the rope guide 50 to accommodate the smallest diameter rotating shaft 4 possible, while FIG. 6C illustrates the connector segment 56 in a second position in which the connector segment 56 has been adjusted to a second fullest extent permitting the rope guide 50 to accommodate the largest diameter rotating shaft 4 possible. In the first fullest extent position, shown in FIG. 6B, a first threaded bolt 72 is positioned at a first end of the slot 58 and a second threaded bolt 72 is positioned at a first end of the slot 60, the first ends being located toward a first end of the connector segment 56. In the second fullest extent position, shown in FIG. 6C, the first threaded bolt 72 is positioned at a second end of the slot 58 and the second threaded bolt 72 is positioned at a second end of the slot 60, the second ends being located toward a second end of the connector segment 56. Thus, the distance between the first ends of the slots 58, 60 may be equal to the distance between the second ends of the slots 58, 60, however, the first end of the slot 60 may be closer to the slot 58 than the second end of the slot 60. The connector segment 56 may be adjusted to any position between the first fullest extent shown in FIG. 6B to the second fullest extent shown in FIG. 6C by moving the threaded bolts 72 along the elongated slot 58 and/or the elongated slot 60 to accommodate a variety of sizes of rotating shafts 4. Once the connector segment 56 has been adjusted to the desired position, the threaded bolts 72 may be tightened to lock the connector segment 56 in place relative to the electrical box 22.

An exemplary configuration and arrangement of the articulating segments 52 and associated clamping members 80 is illustrated in FIGS. 7-13. It is noted that each of the articulating segments 52 may be substantially similar to other articulating segments 52, thus described features, configurations, and aspects described with respect to an articulating segment 52 may be attributed to any of the articulating segments 52 of the rope guide 50. The articulating segments 52 may include a first end 132 and a second end 134, with the channels 70 extending from the first end 132 to the second end 134. The channels 70 of an articulating segment 52 may be aligned with the channels 70 of an adjacent articulating segment to provide continuous channels 70 extending along the rope guide 50. The articulating segments 52 may be configured such that a first end portion of an articulating segment 52 overlaps a second end portion of an adjacent articulating segment 52. For example, a first end portion proximate the first end 132 of the second articulating segment 52*b* may extend into a second end portion proximate the second end 134 of the first articulating segment 52*a*, while a second end portion proximate the second end 134 of the second articulating segment 52*b* may extend over a first end portion proximate the first end 132 of the third articulating segment 52*c*. Each articulating segment 52 of the rope guide 50 may be similarly arranged with adjacent articulating segments 52. It is noted that in other embodiments the overlapping portions may be reversed, if desired, with the first end portion of an articulating segment 52 extending over the second end portion of an adjacent articulating segment 52.

In some embodiments, each guide segment 52 may include an arcuate node 110 at the first end 132 and an arcuate extension 120 at the second end 134. The arcuate extension 120 of the first guide segment 52a may be configured to be slidably disposed over the arcuate node 110 of the second guide segment 52b, the arcuate extension 120 of the second guide segment 52b may be configured to be slidably disposed over the arcuate node 110 of the third guide segment 52c, the arcuate extension 120 of the third guide segment 52c may be configured to be slidably disposed over the arcuate node 110 of the fourth guide segment 52d, the arcuate extension 120 of the fourth guide segment 52d may be configured to be slidably disposed over the arcuate node 110 of the fifth guide segment 52e, etc.

Each of the guide segments 52 may be configured to pivot with respect to an adjacent guide segment 52 about a pivot axis X to adjust the radius of curvature of the rope guide 50. For example, the second end 134 of the guide segments 52 may include a post 90 on each side of the guide segment 52 centered on the pivot axis X about which the guide segments 52 may pivot. The arcuate node 110 may include an arcuate rib 112 configured to be slidably disposed in an arcuate slot 94 of the arcuate extension 120 when the guide segments 52 are pivoted with respect to one another.

Once adjacent guide segments 52 have been pivoted to a desired radius of curvature, the guide segments 52 may be clamped together to lock adjacent guide segments 52 from further pivotable movement with respect to each other. For instance, a first clamp 80 may be used to clamp the first and second guide segments 52a, 52b together at the first hinge point 62a, a second clamp 80 may be used to clamp the second and third guide segments 52b, 52c together at the second hinge point 62b, a third clamp 80 may be used to clamp the third and fourth guide segments 52c, 52d together at the third hinge point 62c, and a fourth clamp 80 may be used to clamp the fourth and fifth guide segments 52d, 52e together at the fourth hinge point 62d. It is noted that clamping at each of the hinge points 62 with a clamp 80 may be substantially similar to other hinge points 62, thus described features, configurations, and aspects described with respect to clamping at a hinge point 62 may be attributed to any of the hinge points 62 of the rope guide 50.

For example, the adjustable rope guide 50 may include a clamp 80 extending over the arcuate extension 120 of the first guide segment 52a and the arcuate node 110 of the second guide segment 52b configured to clamp the arcuate extension 120 of the first guide segment 52a against the arcuate node 110 of the second guide segment 52b. The clamp 80 may include a first arm 82 coupled to a first side of the first guide segment 52a, a second arm 84 coupled to a second side of the first guide segment 52b, and an intermediate portion 86 extending over the arcuate extension 120. The clamp 80 may include a threaded fastener 88 extending through a threaded bore of the intermediate portion 86 to press against the arcuate extension 120 and exert a clamping force against the arcuate extension 120. In some instances, the first arm 82 may be coupled to a post 90 on the first side of the first guide segment 52a and the second arm 84 may be coupled to a post 90 on the second side of the first guide segment 52a. For example, the first arm 82 of the clamp 80 may include an opening 98 for receiving a first post 90 of the first guide segment 52a and the second arm 84 of the clamp 80 may include an opening 98 for receiving a second post 90 of the first guide segment 52a. The clamp 80 may pivot about posts 90 extending from opposite sides of the first guide segment 52a, and thus the pivot axis X. The first end 132 of the second guide segment 52b may include a socket 130 having an arcuate curvature on each side of the second guide segment 52b for receiving the posts 90 of the first guide segment 52a. The posts 90 may be pivotably disposed in the sockets 130 when the guide segments 52 are coupled together.

The clamp 80 may be coupled to the second guide segment 52b such that the clamp 80 moves with the second guide segment 52b when the first guide segment 52a is pivoted relative to the second guide segment 52b. For example, the clamp 80 may include a tab 92 extending from the intermediate portion 86 configured to extend into a notch 96 defined in the arcuate node 110 of the second guide segment 52b. In some instances, the notch 96 may be formed in the arcuate rib 112 of the arcuate node 110. Additionally or alternatively, the first and second arms 82, 84 of the clamp 80 may engage opposing sides of the second guide segment 52b. For example, the second guide segment 52b may include projections 114 extending from the opposing sides of the second guide segment 52b into openings 116 in the first and second arms 82, 84 of the clamp 80. In some instances, the openings 116 may be in communication with the openings 98 for receiving the posts 90 of the first guide segment 52a When assembled together, the tab 92 may extend through the slot 94 of the arcuate extension 120 of the first guide segment 52a and into the notch 96 in the arcuate node 110 of the second guide segment 52b, while the posts 90 and projections 114 extend into the openings 98 and openings 116 of the clamp 80, respectively, on opposing sides of the guide segments 52. Thus, the clamp 80 may couple the first guide segment 52a to the second guide segment 52b, while allowing pivotable movement therebetween. Accordingly, when the first guide segment 52a is pivoted relative to the second guide segment 52b about the pivot axis X, the clamp 80 may pivot about the pivot axis X with the second guide segment 52b and relative to the first guide segment 52a.

Figure 13:
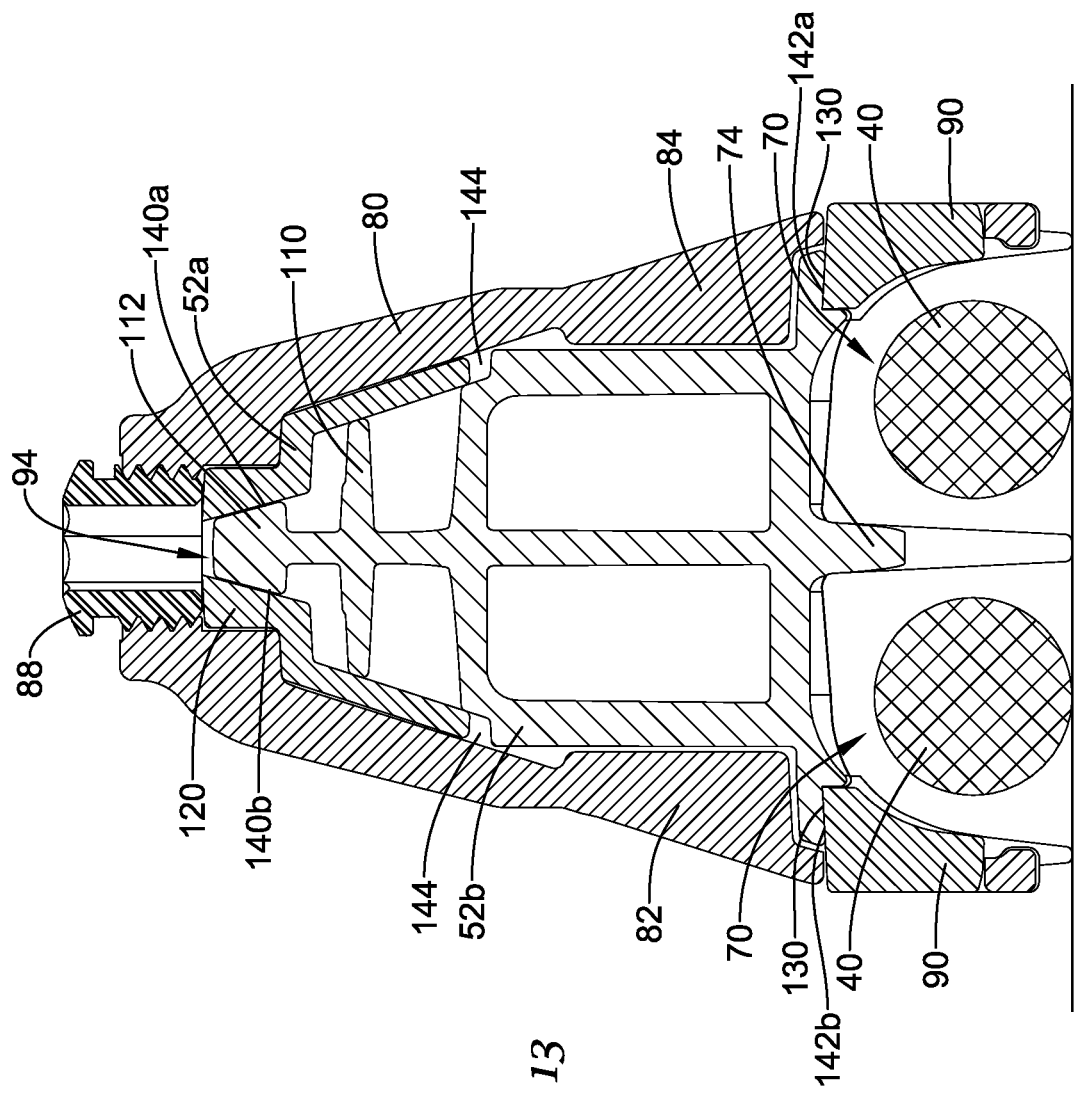
FIG. 13 is a cross-sectional view of the adjustable rope guide taken along line 13-13 of FIG. 7.

Once the guide segments 52 are oriented and the desired radius of curvature of the guide segments 52 of the rope guide 50 is obtained, the guide segments 52 may be clamped together using the clamps 80 to lock the guide segments 52 from further pivotable movement. For example, the threaded fastener 88, threadably engaged in the threaded bore of the intermediate portion 86 of the clamp 80, may be rotated to apply a clamping force to the guide segments 52. For instance, as shown in FIG. 13, the threaded fastener 88 may press against the upper surface of the arcuate extension 120 of the first guide segment 52a, which in turn presses against the rib 112 of the arcuate node 110 of the second guide segment 52b. The clamp 80, which also engages the posts 90 of the first guide segment 52a, exerts an opposing force on the posts 90. The resulting clamping force may urge the arcuate extension 120 of the first guide segment 52a against the arcuate node 110 (e.g., the rib 112) of the second guide segment 52b and the posts 90 of the first guide segment 52a against the sockets 130 of the second guide segment 52b, providing a clamping force to lock the arcuate extension 120 from pivotable movement relative to the arcuate node 110. Thus, as can be seen in FIG. 13, the clamp 80 may be configured to clamp the first end 132 of the second guide segment 52b between the posts 90 of the first guide segment 52a and the arcuate extension 120 of the first guide segment 52a.

In some instances, the first guide segment 52a may be clamped against the second guide segment 52b at four clamping points. For example, the arcuate extension 120 may be clamped against the rib 112 of the arcuate node 110 at first and second clamping points 140a, 140b. As shown in FIG. 13, as the threaded fastener 88 is rotated against the upper surfaces of the first and second arms of the arcuate extension 120, the angled surfaces of the arcuate extension 120 may press against the angled surfaces of the rib 112. The wedge-shape of the rib 112 and the upper portions of the arms of the arcuate extension 120 may cause the wedge-shaped upper portions of the arcuate extension 120 to be wedged between the inner surfaces of the clamp 80 and the angled surfaces of the rib 112. It is noted that the gaps 144 may permit downward movement of the arcuate extension 120 relative to the arcuate node 110 as the upper portions of the arms of the arcuate extension 120 are wedged between the arms 82, 84 of the clamp 80 and the angled surface of the rib 112 of the arcuate node 110 and the clamping force is applied. Due at least in part to the wedge-shaped upper portions of the arms of the arcuate extension 120 and the wedge-shaped rib 112 (the wedge-shaped upper portions of the arms of the arcuate extension 120 being wedged between the inner surfaces of the clamp 80 and the angled surfaces of the rib 112), the clamping forces at the first and second clamping points 140*a*, 140*b* may increase significantly as the threaded fastener 88 is rotated downward against the arcuate extension 120.

Simultaneously, the posts 90 may be clamped against the arcuate surfaces of the sockets 130 at third and fourth clamping points 142*a*, 142*b*. As shown in FIG. 13, as the threaded fastener 88 is rotated against the upper surfaces of the first and second arms of the arcuate extension 120, the clamp 80 may pull the posts 90 against the surfaces of the sockets 130. Thus, rotating the single threaded fastener 88 may simultaneously press the first guide segment 52*a* against the second guide segment 52*b* at two or more, at three or more, or at four or more discrete clamping points 140*a*, 140*b*, 142*a*, 142*b* to resist movement of the first guide segment 52*a* relative to the second guide segment 52*b*.

It is noted that the hinge point 66 between the connector segment 56 and the first guide segment 52*a* may be similar to the hinge points 62 between adjacent guide segments 52. For example, the connector segment 56 may include an arcuate extension 120 configured to extend over an arcuate node 110 of the first guide segment 52*a*, and a clamp 80 may be positioned over the arcuate extension 120 to clamp the arcuate extension 120 to the arcuate node 110 as described above.

Figure 12:
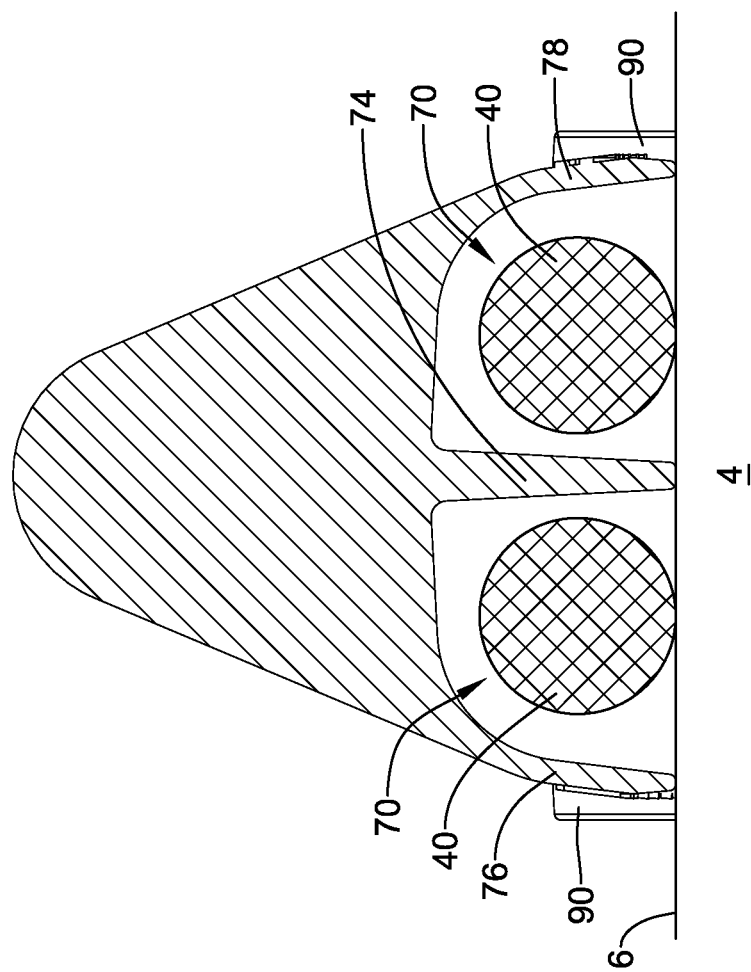
FIG. 12 is a cross-sectional view of the adjustable rope guide taken along line 12-12 of FIG. 7.

Further illustrated in FIGS. 12 and 13 are the channels 70 configured to receive the grounding ropes 40 for positioning along the conductive surface 6 of the rotating shaft 4. As can be seen from the figures, a first channel 70 may be defined between a first side wall 76 on the first side of the guide segment 52 and a divider wall 74, and a second channel 70 may be defined between a second side wall 76 on the second side of the guide segment 52 and the divider wall 74. The channels 70 may extend parallel to one another to position the grounding ropes 40 around a portion of the circumference of the rotating shaft 4. Thus, the channels 70 may open out to the bottom of the guide segments 52 facing the conductive surface 6 of the rotating shaft 4.

The shaft grounding apparatus 20 may be mounted proximate to the rotating shaft 4 to electrically ground the shaft 4 of the electric machine 2. For example, the grounding rope 40 may be placed in contact with the circumferential surface 6 of the rotating shaft 4. For instance, the grounding rope 40 may be draped over the rotating shaft 4 with the free second end 44 of the grounding rope 40 extending in the direction of rotation of the rotating shaft 4. It is noted that in some instances, multiple grounding ropes 40 (depending on the number of channels 70 provided in the rope guide 50) may be draped over the rotating shaft 4 to position the ropes 40 in contact with the surface 6 of the rotating shaft 4.

The adjustable rope guide 50 may also be positioned around a portion of the circumferential surface 6 of the rotating shaft 4 with the rope 40 extending along the channel 70 of the rope guide 50. In instances in which the rope guide 50 includes multiple channels 70, a rope 40 may be positioned in and extend along each channel 70 of the rope guide 50.

In order to accommodate the radius of curvature of the rotating shaft 4 such that the radius of curvature of the articulating segments 52 of the rope guide 50 closely matches the radius of curvature of the rotating shaft 4 and the lower edges of the articulating segments are positioned proximate the surface 6 of the rotating shaft 4, adjacent articulating segments 52 of the rope guide 50 may be pivoted relative to each other to adjust the radius of curvature of the adjustable rope guide 50. Thus, the rope(s) 40 may be circumferentially constrained in the channel(s) 70 of the rope guide 50 along a portion of the circumference of the rotating shaft 4.

In some instances, the connector segment 56 and the articulating segments 52 of the rope guide 50 may be adjusted from a first minimum extent having a radius of curvature of 10 inches or less, 8 inches or less, or 6 inches or less to accommodate a similarly sized rotating shaft 4 to a second maximum extent having a radius of curvature of 10 inches or more, 12 inches or more, 14 inches or more, 16 inches or more, 18 inches or more, or 20 inches or more to accommodate a similarly sized rotating shaft 4. In some instances, the articulating segments 52 may be adjusted to extend substantially flat, thus accommodating rotating shafts 4 having an infinitely large diameter. Accordingly, through the adjustability of the rope guide 50, the rope guide 50 may be mounted to a range of sizes of rotating shafts 4, such as shafts 4 having diameters in the range of 6 to 36 inches, in the range of 6 to 24 inches, in the range of 6 to 20 inches, in the range of 6 to 18 inches, in the range of 6 to 16 inches, in the range of 6 to 14 inches, or in the range of 6 to 12 inches, in some instances.

Once the rope guide 50 has been adjusted to the desired radius of curvature to accommodate the diameter of the rotating shaft 4, the hinge points 62, 66 may be clamped to prevent further pivotable movement between adjacent guide segments 52, and between the connector segment 56 and the first guide segment 52*a*. For example, the threaded fasteners 88 may be tightened against the arcuate extensions 120 to exert a clamping force to clamp the overlapping portions of the segments together as described above.

Accordingly, the rope guide 50 may guide the grounding rope(s) 40 along the rotating surface 6 of the rotating shaft 4. The grounding rope(s) 40 may be electrically grounded (e.g., connected to ground) to draw stray voltage off of the rotating shaft 4 to prevent current flow through bearings and/or other components of the electric machine 2 which could adversely affect the electric machine 2.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An apparatus for electrically grounding a rotatable shaft of a dynamo-electric machine, comprising:
    an electrical box positioned proximate the rotatable shaft of the dynamo-electric machine;
    a rope guide extending from the electrical box in a curvilinear orientation around a portion of the rotatable shaft, the rope guide including a plurality of segments coupled together, wherein the number of segments is determined based on the diameter of the rotatable shaft; and
    a flexible grounding rope arranged in a channel of the rope guide such that the flexible grounding rope is positioned against a circumferential surface of the rotatable shaft;

wherein the flexible grounding rope is in electrical contact with ground.

2. The apparatus of claim 1, wherein each of the plurality of segments includes an arcuate node at a first end and an arcuate extension at a second end configured to slidably engage the arcuate node of an adjacent segment.

3. The apparatus of claim 1, wherein each of the plurality of segments is pivotable relative to adjacent segments to alter a radius of curvature of the rope guide.

4. The apparatus of claim 3, wherein the rope guide includes a clamp to secure adjacent segments of the plurality of segments together at a desired radius of curvature.

5. The apparatus of claim 4, wherein the clamp is configured to generate clamping forces between adjacent segments at three or more discrete clamping points.

6. The apparatus of claim 4, wherein the clamp is configured to generate clamping forces between adjacent segments at four discrete clamping points.

7. The apparatus of claim 1, wherein the rope guide includes a connector segment secured to the electrical box, a first articulating segment pivotably coupled to the connector segment, and a second articulating segment pivotably coupled to the first articulating segment.

8. The apparatus of claim 7, wherein the rope guide includes a first clamp configured to generate clamping forces between the first articulating segment and the second articulating segment to lock the second articulating segment from pivoting relative to the first articulating segment.

9. The apparatus of claim 8, wherein the rope guide includes a second clamp configured to generate clamping forces between the first articulating segment and the connector segment.

10. A method of electrically grounding a rotatable shaft of a dynamo-electric machine, comprising:
   placing an flexible grounding rope in contact with a circumferential surface of the rotatable shaft;
   assembling a plurality of rope guide segments together to form an adjustable rope guide, the number of rope guide segments being assembled together determined based on the diameter of the rotatable shaft;
   positioning the adjustable rope guide around a portion of the circumferential surface of the rotatable shaft such that the flexible grounding rope is arranged in a channel of the rope guide; and
   adjusting a curvature of the rope guide to closely match the circumferential surface of the rotatable shaft by articulating adjacent rope guide segments of the adjustable rope guide.

11. The method of claim 10, further comprising:
   placing the flexible grounding rope in electrical contact with ground.

12. The method of claim 10, wherein the plurality of rope guide segments are assembled together such that the plurality of rope guide segments pivot with respect to each other.

13. The method of claim 12, wherein the plurality of rope guide segments are clamped together after adjusting the curvature of the rope guide to closely match the circumferential surface of the rotatable shaft.

14. The method of claim 12 wherein each of the plurality of rope guide segments includes an end portion overlapping an end portion of an adjacent rope guide segment.

* * * * *